April 25, 1967  C. F. QUICK  3,315,986
MEANS AND METHODS FOR CONNECTING TUBULAR CONDUITS
Filed May 5, 1964  2 Sheets-Sheet 1

INVENTOR.
CARL F. QUICK
BY
ATTORNEY

April 25, 1967        C. F. QUICK        3,315,986

MEANS AND METHODS FOR CONNECTING TUBULAR CONDUITS

Filed May 5, 1964        2 Sheets-Sheet 2

INVENTOR.
CARL F. QUICK
BY
*Alfred W Petchaft*
ATTORNEY

United States Patent Office 3,315,986
Patented Apr. 25, 1967

3,315,986
MEANS AND METHODS FOR CONNECTING
TUBULAR CONDUITS
Carl F. Quick, St. Louis County, Mo.
(11147 Pritchard Drive, St. Louis, Mo. 63136)
Filed May 5, 1964, Ser. No. 365,099
5 Claims. (Cl. 285—21)

The present invention relates in general to certain new and useful improvements in means and methods for quickly affecting a leakproof connection between tubular conduits for liquids and gases.

As pointed out in my co-pending application Ser. No. 324,938, filed Nov. 20, 1963, it is often necessary to connect two tubular conduits through which a liquid or gas may flow. Conventional methods, however, are relatively expensive and involve size-problems. An externally threaded male member and internally threaded female member must have exactly matching threads and diametral sizes, otherwise the connection cannot be made. Very often, the parts of two different manufacturers cannot be mated or interconnected, even though they are nominally of the same thread-type and dimensions.

The average householder frequently encounters another aspect of the problem in the use of garden hoses. It is a common experience for a garden hose to become ruptured or perforated during use, as would be the case if it were accidentally run over with a lawn mower or if it were inadvertently brought into contact with a sharp object. Under such circumstances, it is common practice to repair the hose by cutting out the damaged section and coupling the two severed portions by a so-called hose-coupling, having oppositely projecting groups of annularly spaced prongs which surround oppositely projecting coaxial tubular inserts. This type of repair is not particularly durable because the prongs do not provide complete annular clamping pressure between the interior annular surface of the hose and the outwardly presented annular surface of the tubular insert, and, in addition, the prongs materially weaken the hose and, in time, the coupling will break loose.

It is, therefore, the primary object of the present invention to provide novel means and methods for interconnecting tubular conduits.

It is another object of the present invention to provide novel means and methods of the type stated which can be carried out in a simple and efficient manner.

It is also an object of the present invention to provide novel means and methods of the type stated which are simple, economical and can be utilized without highly specialized tools, equipment or mechanical skills.

It is an additional object of the present invention to provide novel means and methods of the type stated whereby tubular conduits, pipes, pipe fittings, hoses and the like, can be interconnected in a simple leakproof manner.

With the above and other objects in view, my invention resides in the novel features of form, construction, arrangement, and combination of parts presently described and pointed out in the claims.

Figure 1:
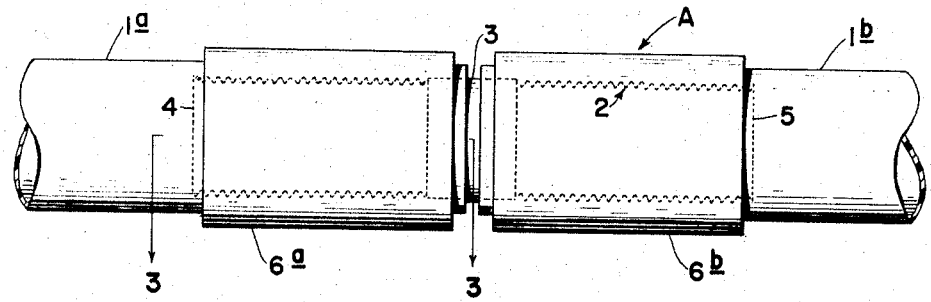
FIG. 1 is a fragmentary top-plan view of a hose connection constructed in accordance with and embodying the present invention.
Figure 2:
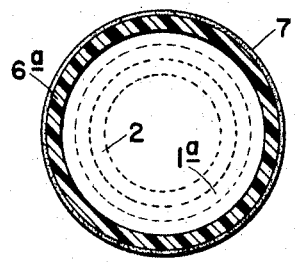
FIG. 2 is a transverse sectional view of the expanded hose connection prior to installation around a piece of hose.
Figure 3:
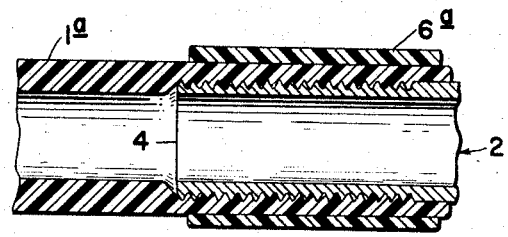
FIG. 3 is a sectional view taken along line 3—3 of FIG. 1.

Referring now in more detail and by reference characters to the drawings, which illustrate practical embodiments of the present invention, A designates a hose-joint or coupling for connecting two sections $1^a$, $1^b$, of conventional tubular hose. Provided for insertion into the proximate ends of the pieces of hose $1^a$ and $1^b$, is a tubular coupling element 2 formed of any suitable rigid material, such as brass, steel, or even a rigid synthetic resin, such as a urea-formaldehyde polymer or a molded melamine. The tubular coupling element 2 is provide with a smooth surfaced central portion 3 and oppositely presented tips 4, 5, having corrugated external surfaces. It should be understood in this connection that instead of the corrugation, it is possible to employ any other form of serrations which will increase the frictional engagement between the outwardly presented surface of the tips 4, 5, and the interior annular surfaces of the hose-sections or pieces $1^a$, $1^b$.

Also provided for disposition externally around the end portions of the hose-sections or pieces $1^a$, $1^b$, are two matching connector sleeves $6^a$, $6^b$, formed of so-called "heat-shrinkable synthetic resins." A number of synthetic resins such as solid polyolefin resins, polyvinylchloride resins, neoprene (polymerized chloroprene), tetrafluoroethylene resins, and polyorgano siloxane elastomers can be treated by various conventional methods so as to have heat-shrinkable properties. This is most commonly accomplished by irradiating the resin with a high-voltage electron ionizing discharge which, it is believed, produces cross-linkages within the polymer so that the material can be expanded mechanically to some selected size or shape and cooled while being held in this expanded position. When heated, the material will shrink and return to the original size and shape and at the same time increase the number of cross-linkages so as to become more rigid. This property is sometimes referred to in the plastics industry as a "memory." Many of these polymers have an inherent memory and do not require irradiation, but may simply be heated, expanded, and allowed to cool in the expanded position. When such polymers are again heated, they will return to their original size and shape. It is also known that in the case of many such copolymers, heat-shrinkable properties can be obtained by treatment with organic peroxides. It has been found, in connection with the present invention, that connector sleeves made of heat-shrinkable resins will not only shrink when heated, but possess a so-called "memory" which seems to extend for an indefinitely long period of time and, therefore, have a desirable degree of shelf-life. It has also been experimentally demonstrated in connection with the present invention that the compressive forces generated by the resin during heat-shrinkage are quite substantial in magnitude.

The tubular connector sleeves $6^a$, $6^b$, are made from heat-shrinkable synthetic resin tubing which is preferably extruded to an internal diametral size approximately 20% smaller than the external diametral size of the hose-sections $1^a$, $1^b$, whatever that may happen to be. The axial length of the connector sleeves $6^a$, $6^b$, may be of any suitable or convenient dimension, but should be somewhat shorter than the length of the tips 4, 5, of the coupling element 2. In this connection, it also should be noted that the dimensions of the tubular coupling element 2 may be selected so as to fit snugly within the hose-sections $1^a$, $1^b$. Although the axial length is not particularly critical, it should not be too short. In actual practice, it has been found convenient to employ a coupling element having an overall axial length of 3½ inches with a central section 2 which is approximately ½ inch long and tips 4, 5, which are 1½ inches long. For a coupling element 2 of such dimensions, it has been found convenient to employ connector sleeves $6^a$, $6^b$, having an axial length of 1⅜ inches and a wall-thickness of approximately 1/16 inch to ⅛ inch. Of course, for large diameter pipes and higher pressures, greater wall thickness should be employed.

The connector sleeves $6^a$, $6^b$, are heated to a temperature slightly above the crystalline melting point of the synthetic resin, and while being maintained at this temperature, are expanded to an inside diametral size approximately 10% greater than the outside diametral size of the hose-sections $1^a$, $1^b$. In effecting mechanical expansion, reasonable care should be taken to avoid causing any substantial change in the length of the connector sleeves $6^a$, $6^b$. Immediately following heat treatment and mechanical expansion, the connector sleeves $6^a$, $6^b$, are cooled, while being mechanically held in such expanded position. As a result of cooling, the polymer crystallizes and remains in the expanded size and shape. Thereupon, the external cylindrical surfaces of the sleeves $6^a$, and $6^b$ are coated with a film or layer 7 of a pyrotechnical material.

By way of illustration and not for purposes of limitation, the following are examples of suitable pyrotechnical materials:

I

| | Parts |
|---|---|
| Potassium chlorate | 55 |
| xxxC grade charcoal | 10 |
| Fine glass powder and infusorial earth, 50–50 | 20 |
| Nitro-cellulose lacquer which is to be made into a solution by the addition of a solvent such as acetone | 15 |

II

| | Percent |
|---|---|
| Potassium nitrate | 75 |
| Sulphur | 10 |
| Charcoal | 15 |
| Nitro-cellulose lacquer base (as per Example I) | 25 |

III

| | |
|---|---|
| Boron | 10 |
| Barium chromate | 90 |

Above mixed in a 25% nitro-cellulose lacquer base (as per Example I).

IV

| | |
|---|---|
| Silicon | 33⅓ |
| Lead dioxide | 33⅓ |
| Cuprous oxide | 33⅓ |

Above mixed in a 25% nitro-cellulose lacquer base (as per Example I).

The above designated compositions have been found to be safe and will produce a gentle, non-explosive glowing type of heat which will generate a temperature in the range of 700 to 900° Fahrenheit within the body of the pyrotechnical film. Assuming that the pyrotechnical film has a thickness in the range of 25 to 35 mils, ignition will occur over a period of 30 to 40 seconds and the residual material or end products of combustion will retain heat for another 30 to 60 seconds. Since the pyrotechnical coating or film is external and is exposed to ambient air, a portion of the heat generated upon ignition will be dissipated with the result that the effective heat transmitted into the heat-shrinkable sleeve will raise the temperature of such sleeve to a range of 200 to 500° Fahrenheit.

It has also been found in connection with the present invention that, contrary to ordinary expectations, the pyrotechnical coating does not burn, char, or discolor the heat shrinkable plastic sleeve and, moreover, after ignition, the coating is converted into a loosely consolidated, somewhat powdery, flaky crust which can easily be brushed off, wiped off, or washed away.

Figure 4:
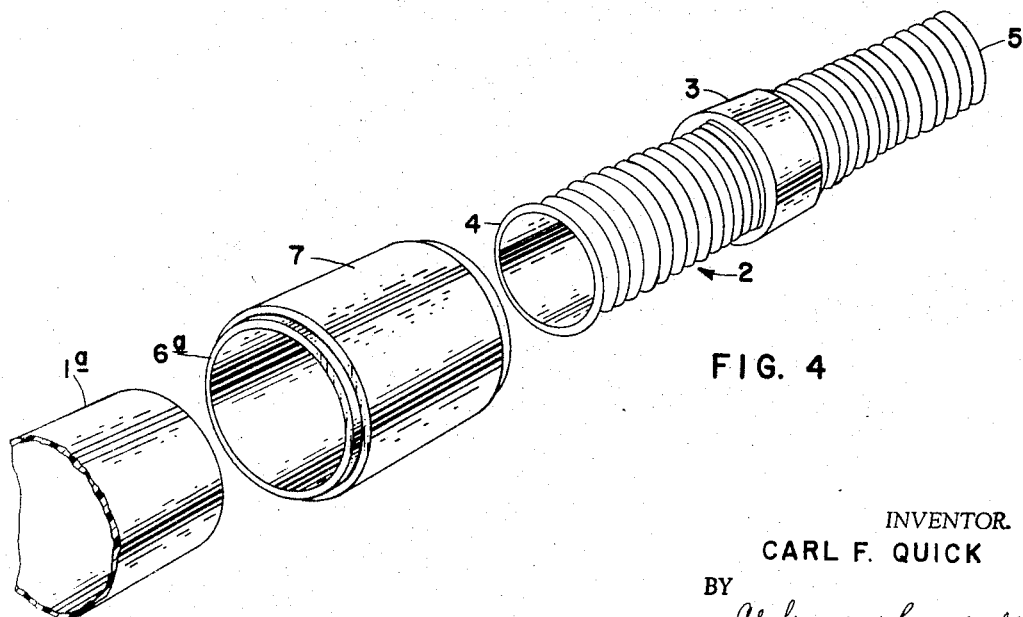
FIG. 4 is a fragmentary exploded perspective view of a portion of the hose-coupling shown in FIG. 1, illustrating the method by which the component elements can be operatively interconnected.

In order to effect connection between the hose-sections $1^a$, $1^b$, in accordance with the present invention, the coupling element 2 is inserted into the proximate ends thereof substantially as shown in FIG. 4. Thereupon, the ends of the hose-sections $1^a$, $1^b$, are in endwise abutment against the central portion 3 of the coupling element 2. The connector sleeves $6^a$, $6^b$, are then slid into position externally around the hose-sections $1^a$, $1^b$, in overlying or annular alignment with the tips 4, 5. In this assembled relationship, the pyrotechnical layers or coatings 7 are ignited and will burn slowly bringing the bodies of the sleeves $6^a$, $6^b$, to a temperature within the range of 320° F. to 500° F. for a period of approximately two to three minutes. During such period of time and while at the aforesaid temperature range, the connector sleeves $6^a$, $6^b$, will shrink into snug contour-fitting engagement with the hose-sections $1^a$, $1^b$, substantially as shown in FIG. 1. The connector sleeves $6^a$, $6^b$, are then allowed to cool at ambient conditions and in the cooling process will continue to shrink somewhat so as to exert a substantial annular compressive force upon the hose-sections, binding them firmly in leak-proof engagement with the tips 4, 5 of the coupling element 2.

Figure 5:
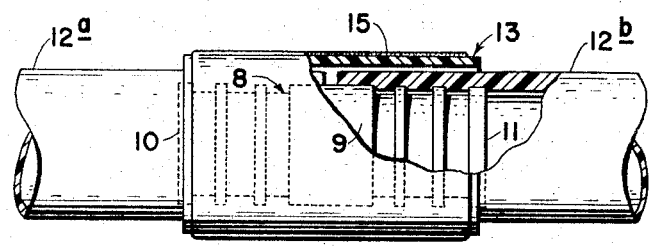
FIG. 5 is a fragmentary top plan view, partly broken away and in section, of a modified form of hose coupling embodying the present invention showing the several parts in assembled relation prior to heat-shrinking.

It is also possible to provide a modified form of hose coupling B, as shown in FIG. 5, which comprises a tubular coupling element 8 formed of brass or other similar rigid material similar to the previously described coupling element 2, and integrally including a central cylindrical section 9, and two oppositely extending coaxial tips 10, 11, which have corrugated external surfaces. The coupling element 8 has an external diametral size such that it will fit snugly into the hose-sections $12^a$, $12^b$, which are to be joined. Provided for cooperation with the coupling element 8 is a single tubular sleeve 13 formed of a heat-shrinkable synthetic resin such as one of those heretofore discussed. The sleeve 13 is long enough to extend substantially across the full axial length of the coupling element 8 and is extruded or otherwise formed to an initial internal diametral size about 20% smaller than the outside diametral size of the hose-sections $12^a$, $12^b$. The sleeve 13 is expanded in the manner previously described and used in substantially the same manner as previously described in connection with the hose-coupling A, and is likewise provided with an external film or layer 15 of a pyrotechnical material. Obviously, the diametral size, length, and other dimensions of the coupling element 8 and sleeve 13 are governed by the size of the hose-sections $12^a$, $12^b$, or other tubular conduits which are to be joined. When mechanically assembled as shown in FIG. 5, the layer 15 is ignited and the sleeve 13 heat-shrinks into place.

Figure 6:
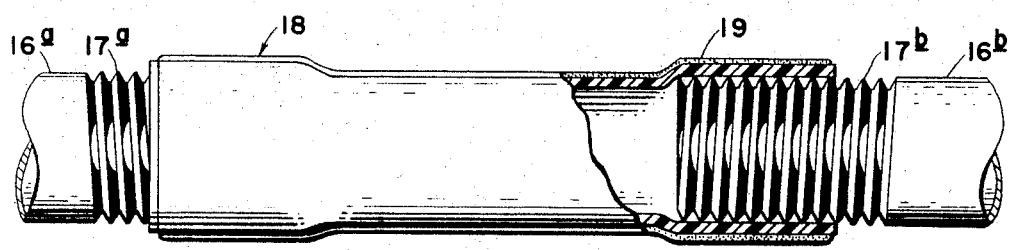
FIG. 6 is a fragmentary side elevational view, partly broken away and in section, illustrating the use of the means and methods of the present invention for connecting two pieces of rigid pipe having conventional pipe threads.

It is also possible to join two pieces of pipe $16^a$, $16^b$, which have externally threaded ends $17^a$, $17^b$, respectively, by inserting such ends into a tubular sleeve 18 formed of a heat-shrinkable synthetic resin which has been extruded or otherwise formed to an initial internal diametral size approximately 10% smaller than the external diametral size of the pipe ends 14ª, 14ᵇ, and expanded to about 10% over the external diametral size thereof. The sleeve 18 is provided with a film or layer 19 of pyrotechnical material in the same manner as the previously described sleeves 6ª, 6ᵇ, and 13. The sleeve 18 can be slipped easily over the pipe ends 16ª, 16ᵇ, as shown in FIG. 6, and heat-shrunk into place by igniting the layer 19.

Figure 7:
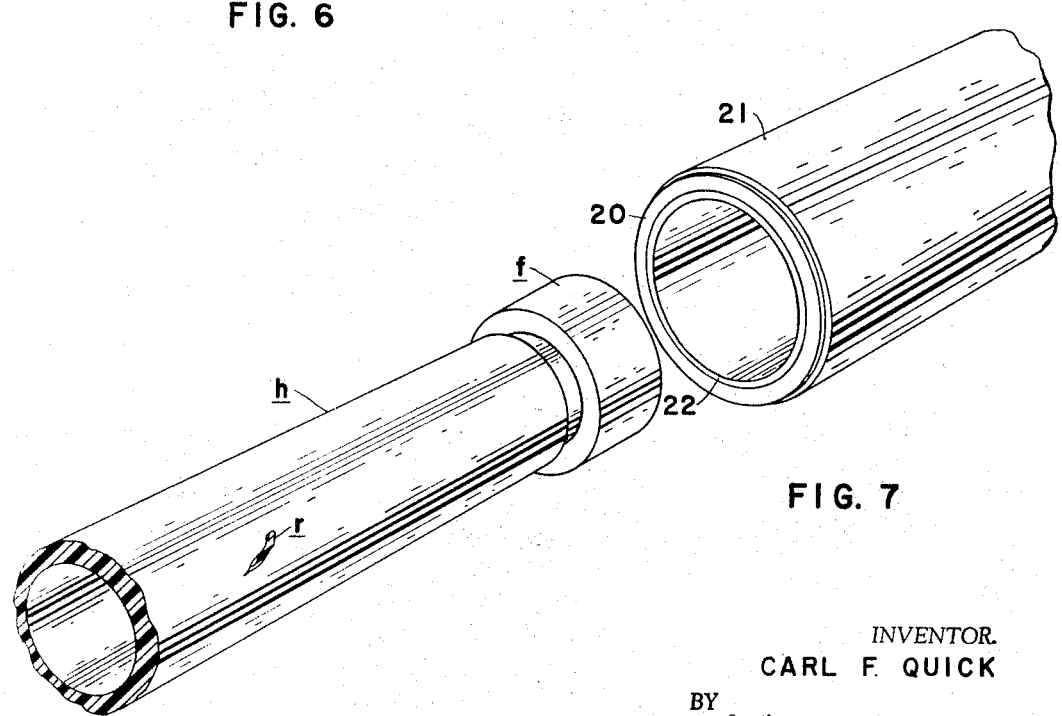
FIG. 7 is a fragmentary perspective view illustrating the use of the means and methods of the present invention for repairing a damaged piece of hose.

It is also possible to provide a repair sleeve 20 for use in closing leaks, cuts or ruptures such as the rupture *r* in the piece of conventional garden hose *h* shown in FIG. 7. The repair sleeve 20 is also extruded or otherwise formed from a heat-shrinkable synthetic resin and has an initial internal diameter about 10% to 15% smaller than the outside diametral size of the garden hose *h*. Thereupon, the sleeve 20 is heated and expanded, in the manner previously discussed, in an internal diametral size large enough to slip freely over the conventional hose fitting *f*. The sleeve 20 is similarly provided with an external layer or coating 21 of pyrotechnical material. Preferably, the interior of the sleeve 20 is then provided with a thin annular layer 22 of a thermoplastic adhesive which has a melting or softening point in the temperature range at which the sleeve 20 will heat-shrink.

The rupture *r* can be quickly and easily repaired by slipping the sleeve 20 over the fitting *f* and along the garden hose *h* until it is located over the rupture *r* and extends equidistantly on opposite ends thereof. The layer 21 is ignited and heat-shrunk, as above described. During the course of heat-shrinking, the adhesive layer 22 will become soft and tacky and will effectively seal the rupture *r* as the sleeve 20 shrinks down into tight embracing engagement with the garden hose *h*. In this connection, it has been found by actual test that, except where the rupture *r* is large and extensive, the sleeve 20 can be used without the adhesive layer 22 and will effect a thorough, long-lasting repair.

Tubular connector sleeves and repair sleeves made of a polyolefin such as polyethylene, polyvinylchloride, or synthetic elastomers such as neoprene, Teflon, and siloxane resins, all in approximately the same dimensions above specified, have been found to produce similar satisfactory results. The temperature ranges to which such materials must be heated vary somewhat, but the crystalline melting point in each case is well-known and can be ascertained from the literature or by reference to the manufacturer of such material. Actually, it has been found desirable, in expanding the connector sleeves and in heat-shrinking them, to use a temperature which is approximately 15° F. above the crystalline melting point.

It should be understood that changes and modifications in the form, construction, arrangement, and combination of the several parts of the means and methods for connecting tubular conduits may be made and substituted for those herein shown and described without departing from the nature and principle of my invention.

Having thus described my invention, what I claim and desire to secure by Letters Patent is:

1. A connecting and repair sleeve for tubular conduits, sad sleeve comprising a tubular element formed from heat-shrinkable polymerized chloroprene, said tubular element having an orginal internal perimetral size smaller than the outside perimetral size of the tubular conduit, and being provided on its outer peripheral surface with a coating of pyrotechnical material, said tubular element having been expanded to a size substantially larger than the outside diametral size of the tubular conduit whereby it can be freely slipped telescopically over said tubular conduit, said coating being applied directly to the outer surface of said tubular element, said coating being of a nature to closely adhere to the outer wall surface of said sleeve within the range of and during contraction of said sleeve, so that said coating remains in continuous contact with the tubular element after it commences to shrink.

2. A connecting and repair sleeve for tubular conduits, said sleeve comprising a tubular element formed from heat-shrinkable tetrafluoroethylene, said tubular element having an original internal perimetral size smaller than the outside perimetral size of the tubular conduit, and being provided on its outer peripheral surface with a coating of pyrotechnical material, said tubular element having been expanded to a size substantially larger than the outside diametral size of the tubular conduit whereby it can be freely slipped telescopically over said tubular conduit, said coating being applied directly to the outer surface of said tubular element, said coating being of a nature to closely adhere to the outer wall surface of said sleeve within the range of and during contraction of said sleeve, so that said coating remains in continuous contact with the tubular element after it commences to shrink.

3. A connecting and repair sleeve for tubular conduits, said sleeve comprising a tubular element formed from heat-shrinkable polyorgano siloxane elastomers, said tubular element having an original internal perimetral size smaller than the outside perimetral size of the tubular conduit, and being provided on its outer peripheral surface with a coating of pyrotechnical material, said tubular element having been expanded to a size substantially larger than the outside diametral size of the tubular conduit whereby it can be freely slipped telescopically over said tubular conduit, said coating being applied directly to the outer surface of said tubular element, said coating being of a nature to closely adhere to the outer wall surface of said sleeve within the range of and during contraction of said sleeve, so that said coating remains in continuous contact with the tubular element after it commences to shrink.

4. A coupling unit for connecting tubular conduits and the like, which coupling unit comprises in combination a tubular insert having oppositely presented tip portions adapted to fit snugly within the ends of the tubular conduits which are to be connected, and a tubular element formed from a heat-shrinkable synthetic resin, and being provided on its outer peripheral surface with a coating of pyrotechnical material, said tubular element having an original internal perimetral size smaller than the outside perimetral size of the tubular conduit, said tubular element having been expanded to a size substantially larger than the outside diametral size of the tubular conduit whereby it can be freely slipped telescopically over said tubular conduit, said coating being applied directly to the outer surface of said tubular element, said coating being of a nature to closely adhere to the outer wall surface of said sleeve within the range of and during contraction of said sleeve, so that said coating remains in continuous contact with the tubular element after it commences to shrink.

5. A coupling unit for connecting tubular conduits and the like, which coupling unit comprises in combination a tubular insert having oppositely presented tip portions adapted to fit snugly within the ends of the tubular conduits which are to be connected, and a pair of tubular elements formed from a heat-shrinkable synthetic resin, each being provided on its outer surface with a coating of pyrotechnical material, said tubular elements having an original internal perimetral size smaller than the outside perimetral size of the tubular conduit, said tubular elements having been expanded to a size substantially larger than the outside diametral size of the tubular conduits whereby they can be freely slipped telescopically over said tubular conduits, said coating being applied directly to the outer surface of said tubular element, said coating being of a nature to closely adhere to the outer wall surface of said sleeve within the range of and during contraction of said sleeve, so that said coating remains in continuous contact with the tubular element after it commences to shrink.

References Cited by the Examiner

UNITED STATES PATENTS

| | | | |
|---|---|---|---|
| 815,990 | 3/1906 | Ward | 285—251 |
| 2,027,962 | 1/1936 | Currie. | |
| 2,295,840 | 9/1942 | Grint | 285—258 |
| 2,460,667 | 2/1949 | Wurzburger | 285—21 |
| 2,713,383 | 7/1955 | Kennedy | 156—86 |
| 2,930,634 | 3/1960 | Merritt | 285—21 |
| 2,941,911 | 6/1960 | Kumnick et al. | 156—86 |
| 2,992,457 | 7/1961 | Harrison. | |
| 3,022,209 | 2/1962 | Campbell | 285—21 X |
| 3,024,045 | 3/1962 | Cleminshaw et al. | 285—21 |
| 3,051,509 | 8/1962 | Wilton et al. | 285—21 |
| 3,139,468 | 6/1964 | Wheat. | |

FOREIGN PATENTS

| | | |
|---|---|---|
| 652,054 | 4/1951 | Great Britain. |
| 873,095 | 7/1961 | Great Britain. |

CARL W. TOMLIN, *Primary Examiner.*

T. A. LISLE, *Assistant Examiner.*